June 24, 1958 J. LUBANSKI 2,839,865
CONVERTIBLE APPLIANCE FOR SPORTSMAN
Filed March 29, 1957 2 Sheets-Sheet 2
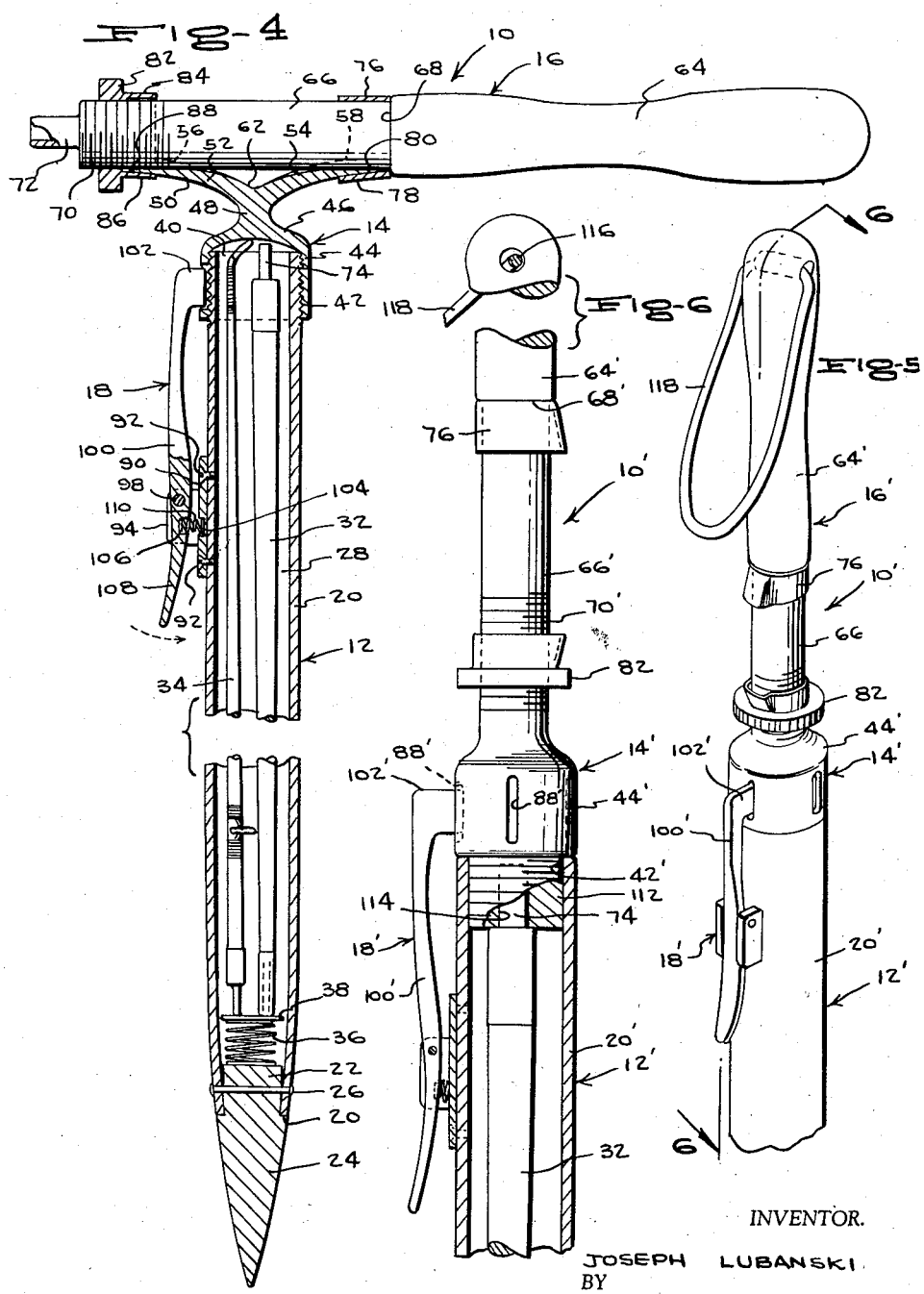
INVENTOR.
JOSEPH LUBANSKI
BY
McMorrow, Berman & Davidson
ATTORNEYS

United States Patent Office 2,839,865
Patented June 24, 1958

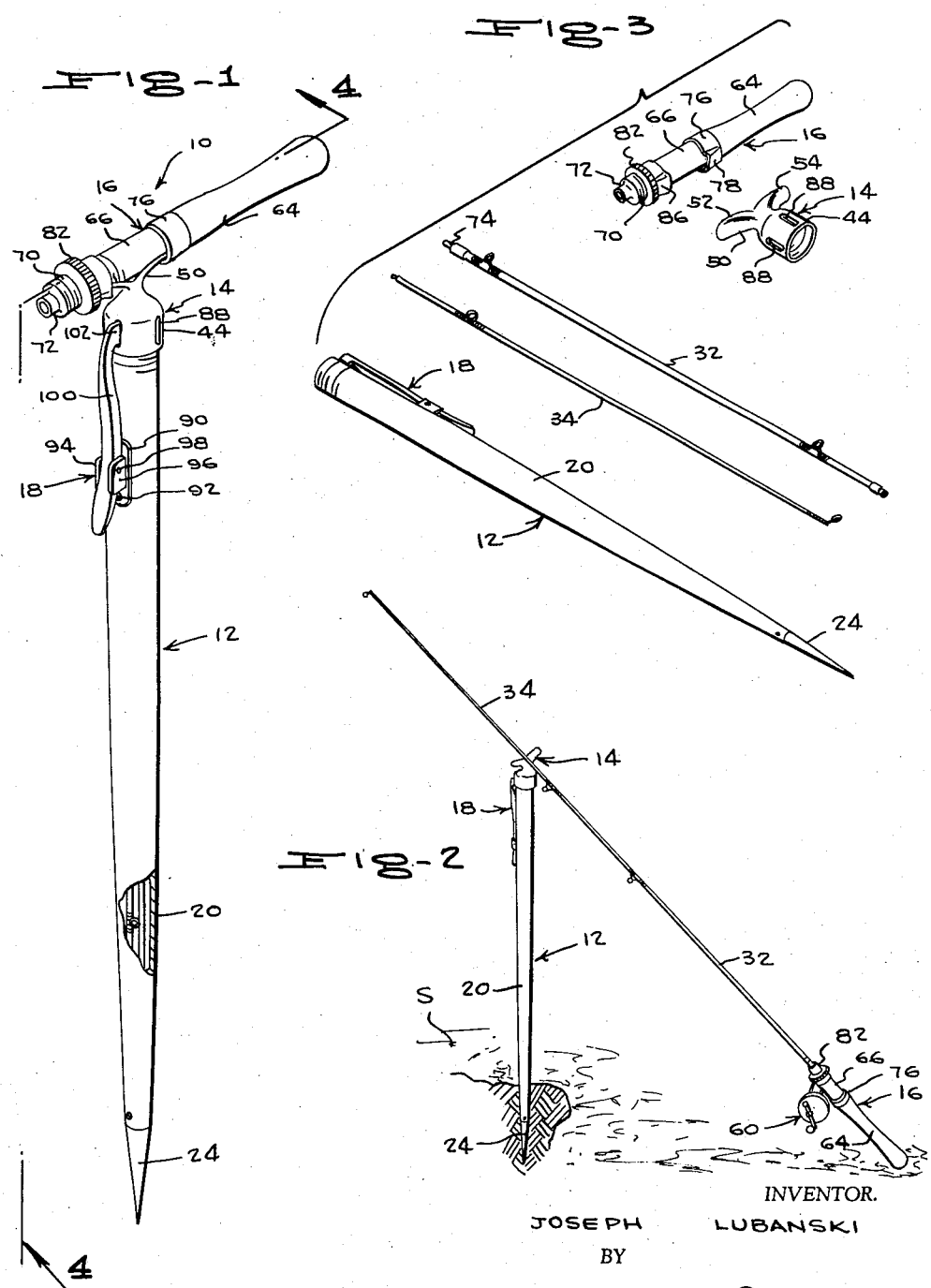

2,839,865
CONVERTIBLE APPLIANCE FOR SPORTSMAN

Joseph Lubanski, Pine Grove, Calif.

Application March 29, 1957, Serial No. 649,468

3 Claims. (Cl. 43—26)

This invention relates generally to a sportsman's appliance, and is more particularly concerned with a convertible appliance for sportsmen including means providing a walking stick or the like for containing a plurality of sections of a fishing rod, said walking stick including a handle member comprising the handle of the walking stick and the handle for the fishing rod.

Another object of invention in conformance with that set forth is to provide an improved convertible appliance of the character involved, wherein the walking stick of the appliance includes means for removably mounting a handle member transversely of one end of a tubular case for containing a plurality of fishing rod sections, wherein said means provides a support for an intermediate portion of an assembled fishing rod transversely disposed thereacross.

And yet another object of invention in conformance with that set forth is to provide a convertible appliance of the character involved which is readily and economically manufactured, easily used, and highly satisfactory and practical for the purpose intended.

These together with other objects and advantages which will subsequently become apparent reside in the details of construction and operation as more fully hereinafter described and claimed, reference being had to the accompanying drawings forming a part hereof, wherein like numerals refer to like parts throughout, and in which:

Figure 1 is a perspective view of the convertible appliance of the invention, a portion being broken away and shown in section for clarity;

Figure 2 is a perspective view, on a reduced scale, showing the manner in which the convertible appliance may be utilized as a support for an assembled fishing rod;

Figure 3 is an exploded perspective view showing the constituent parts of the convertible appliance of the invention;

Figure 4 is an enlarged section taken substantially on the plane of line 4—4 of Figure 1;

Figure 5 is an enlarged perspective view of another embodiment of the convertible appliance of the invention; and Figure 6 is a section, on an enlarged scale, taken substantially on the plane of line 6—6 of Figure 5, portions being broken away and shown in section for clarity.

Referring to the drawings in detail, indicated generally at 10 is one embodiment of the convertible appliance showing the same in its assembled condition for use as a walking stick or the like. Any suitable size and material may be adopted in the construction of the novel appliance. The convertible appliance 10 includes an elongated tubular case indicated generally at 12, closure cap means indicated generally at 14, a handle member indicated generally at 16, said case 12 incorporating thereon lock means indicated generally at 18 operatively engageable with the closure cap means as will subsequently become apparent.

The tubular case 12 incorporates an elongated tubular body member 20 longitudinally tapered and telescopically receiving in its lower end 20 a suitably conformed portion 22 of a longitudinally extending sharpened end element 24 which is secured therein by means of a suitable transverse retaining rivet 26 extending through aligned apertures of the body member 20 and a bore portion in said element 24. Element 24 (see Figure 2), facilitates the insertion of the same into a support surface S substantially retaining the case 12 in vertically extending relationship therefrom for having extending transversely of the closure means 14 and intermediate portion of an assembled fishing rod.

The body member 20 provides therein a longitudinal chamber 28 closed at one end by the element 24 and storing therein elongated sections 32 and 34 of a conventional fishing rod. The sections 32 and 34 may be assembled in longitudinally extending relationship seen in Figure 2 as is conventional. In order to assist in the removal of the fishing rod sections 32 and 34 from the interior of the body member 20 and to prevent excessive rattling of the same when the appliance is used as a walking stick, disposed within the chamber 28 in engagement with the end of portion 22 of the pointed element 24 is a suitably rated compression spring 36 abuttingly engageable with a plate element 38 extending transversely of the chamber 28. The plate 38 is engageable with an end portion of the rod sections 32 and 34, and will be of sufficient strength to urge said rod sections above the upper open end 40 of the case member 20 when the closure cap means 14 is removed therefrom. The spring 36 will provide a spring-urged abutment for preventing excessive rattling of the rod sections 32 and 34 within the chamber 28.

The body member 20 incorporates adjacent the open upper end 40 thereof an externally threaded portion 42 removably receiving thereon an internally threaded suitably conformed body member 44 of the closure cap means 14. The body member 44 includes integral with the transverse top portion 46 thereof an upwardly extending portion 48 continuing in a transverse support plate 50. The support plate 50 includes diverging arms 52 and 54 arcuately conformed relative to the transverse axis thereof as indicated at 56 and 58, respectively, for conforming with the outer surface of that portion of the handle member 16 upon which similar portions of a conventional fishing reel indicated generally at 60, see Figure 2, is mounted. Intermediate the arms 52 and 54 is a transverse notch portion 62 for receiving therein an intermediate portion of the assembled fishing rod for supporting the same as is conventional, see Figure 2.

The handle member 16 incorporates an elongated handle 64 integral with a longitudinally extending mounting portion 66 defining a shoulder portion 68 therewith. The portion 66 at the end opposite the handle 64 is externally threaded as indicated at 70 and includes longitudinally therefrom a suitable tubular ferrule portion 72 for telescopically receiving therein a terminal shaft portion 74 of the rod section 32. Circumposed about the portion 66 of the handle member is an annular clamp 76 laterally offset as indicated at 78 to a suitable slot or recess 80 which will conform to the terminal end of the arm 54 of the support plate portion 50. Circumposed about the threaded portion 70 and portion 66 of the handle member is a suitable clamp nut 82 incorporating an annular skirt or flange portion 84 opening toward the clamp ring 76 and including therein a laterally offset portion 86 defining with the outer periphery portion 66 of the handle member longitudinally extending suitably conformed slot 88 for receiving therein the terminal end of the arm 52 of the support plate portion 50. The clamp 76 and nut 82 are utilized for mounting the reel assembly 60 on the handle member, and are likewise utilized for mounting the handle member transversely of the case 12 as clearly seen in Figures 2 and 1, respectively.

The body member 44 of the closure cap means 14 has extending relative to the longitudinal axis thereof elongated slots or recesses 88 for cooperating with the lock means 18 in a manner to subsequently be described in detail. The lock means 18 comprises a mounting plate 90 suitably secured in longitudinally extending relationship on the outer surface of the body member 20 of the tubular case by means of suitable screw elements 92, for example. The plate 90 has extending normal to the outer surface thereof and integral therewith a pair of mutually parallel pivot ear elements 94 and 96 which have extending transversely through intermediate suitably apertured portions a pivot pin element 98. Intermediately pivoted on the pivot pin element 98 is an elongated lever element 100 extending longitudinally of the body member 20 and including at its upper end a laterally extending suitably conformed dog portion 102 receivable within one of the slots 88 of the body member 44 for preventing rotation of the body member 44 relative to the tubular casing 12. The plate 90 incorporates a suitable outwardly opening recess 104, see Figure 4, underlying a similar recess 106 formed in the undersurface of the lever 100 in the end 108 extending away from the pivot pin element 98 opposite the end of the lever from which the dog portion 102 extends, said recesses 104 and 106 receiving therein a suitable compression spring 110 biasing the dog portion 102 into one of said slots or recesses 88. The lever portion 108 comprises a finger or hand engageable portion for moving said lever in the direction indicated by the dotted arcuate directional of Figure 4, the pivot pin element 98 providing a fulcrum for said lever.

Considering Figures 5 and 6, another embodiment of the convertible appliance is disclosed therein and indicated generally at 10', said appliance 10' includes a tubular case indicated generally at 12' on the open upper end thereof closure cap means indicated generally at 14' integral with a longitudinally extending handle member indicated generally at 16'. Mounted on an intermediate outer surface portion of the tubular case 12' and identical with the lock means 18 previously described in detail, is lock means 18'. The lower portion of the tubular case 12' is identical with the previously described embodiment and accordingly a description thereof is believed to be unnecessary.

The tubular case 12' incorporates a body member 20' including adjacent the upper end about the inner periphery thereof internal threads indicated at 42'.

The closure cap means 14' comprises a body portion 44' including on one end a reduced diametered externally threaded plug portion 112 externally threaded to be received on the threads 42' of the body member 20'. Opening into the end of the plug portion 112 for receiving the stub shaft 74 of the fishing rod section 32 therein is a blind bore portion 114. Opening into the outer surface of the body member 44' are a plurality of longitudinally extending elongated slots or recesses 88' for removably receiving therein the dog portion 102' of the lever 100' of the lock means 18'.

The handle member 16' extends integrally and longitudinally from the body portion 44', the portion 66' thereof being integral with a suitable handle 64'. The portion 66' is externally threaded as indicated at 70' receiving thereon a clamp nut 82. The mounting portion 66' is of a reduced diameter as compared with the handle 64' and defines therewith an annular shoulder portion 68'. Circumposed about the mounting portion 66' is an annular clamp ring 76. The handle 64' has extending transversely therethrough a suitable aperture or bore 116 through which an intermediate portion of a suitable endless thong 118 is disposed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. In an appliance of the character involved, an elongated tubular case closed at one end and open at the other end for containing a plurality of sections of a fishing rod, closure cap means removably received on the open end of the case, and a handle member on said closure cap means including means thereon for supporting a fishing reel, said closure cap means comprising a body member conforming to the open end of the case, said body member including a transverse support plate portion including a transverse intermediate notch for supporting a fishing rod intermediately thereacross, said means on the handle member for supporting a fishing reel detachably engaging the support plate portion and disposing the handle member transversely of the tubular case.

2. In an appliance as set forth in claim 1, wherein said tubular case includes a lower sharpened end facilitating the insertion thereof in a support surface.

3. In an appliance of the character involved, an elongated tubular case closed at one end and open at the other end for containing a plurality of sections of a fishing rod, closure cap means removably received on the open end of the case, and a handle member on said closure cap means including means thereon for supporting a fishing reel, said closure cap means and case including cooperating displaceable lock means for retaining said closure cap means on said case, said closure cap means including a body portion removably retained on the open end of said case, said lock means comprising an intermediately pivoted lever mounted longitudinally of an intermediate portion of the outer surface of the case, said lever including a lateral dog portion at one end thereof engageable with the outer surface of the body portion of the closure cap means, aperture means in the body portion of the closure cap means removably receiving the dog portion therein for preventing removal of the closure cap means from the case, and spring means extending between the lever and case normally biasing the dog portion toward the aperture means.

References Cited in the file of this patent
UNITED STATES PATENTS

| | | |
|---|---|---|
| 389,335 | Spear | Sept. 11, 1888 |
| 1,020,044 | McGuire | Mar. 12, 1912 |
| 1,336,088 | Poremba | Apr. 6, 1920 |
| 2,276,524 | Taylor | Mar. 17, 1942 |